(12) United States Patent
Hassan (10) Patent No.: US 10,769,274 B2
(45) Date of Patent: *Sep. 8, 2020

(54) SECURITY IN MICROSERVICE ARCHITECTURES

(71) Applicant: SAP SE, Walldorf (DE)

(72) Inventor: Ahmad Hassan, Belfast (GB)

(73) Assignee: SAP SE, Walldorf (DE)

( * ) Notice: Subject to any disclaimer, the term of this patent is extended or adjusted under 35 U.S.C. 154(b) by 346 days.

This patent is subject to a terminal disclaimer.

(21) Appl. No.: 15/677,728

(22) Filed: Aug. 15, 2017

(65) Prior Publication Data

US 2019/0057213 A1    Feb. 21, 2019

(51) Int. Cl.
| | | |
|---|---|---|
| *G06F 21/55* | (2013.01) | |
| *H04L 12/24* | (2006.01) | |
| *H04L 29/06* | (2006.01) | |
| *H04L 29/08* | (2006.01) | |
| *H04L 29/14* | (2006.01) | |

(52) U.S. Cl.
CPC ............ *G06F 21/55* (2013.01); *H04L 41/08* (2013.01); *H04L 41/142* (2013.01); *H04L 63/0227* (2013.01); *H04L 63/1425* (2013.01); *H04L 63/1458* (2013.01); *H04L 67/10* (2013.01); *H04L 67/1031* (2013.01); *H04L 67/1097* (2013.01); *H04L 67/141* (2013.01); *H04L 67/42* (2013.01); *H04L 69/40* (2013.01)

(58) Field of Classification Search
CPC . H04L 63/1416; H04L 63/1408; H04L 63/20; H04L 63/1425; H04L 63/1441; H04L 63/0263; H04L 63/105; H04L 67/30; H04L 63/0227; G06F 21/629; G06N 20/00; G06N 7/005; G06N 3/0472; G06K 9/6256; G06K 9/6267; G06K 9/6269; G06K 9/00288; G06K 9/46

See application file for complete search history.

(56) References Cited

U.S. PATENT DOCUMENTS

| | | |
|---|---|---|
| 2010/0070856 A1 | 3/2010 | Behl et al. |
| 2013/0297802 A1 | 11/2013 | Laribi |
| 2014/0137259 A1 | 5/2014 | Chen et al. |
| 2015/0039744 A1 | 2/2015 | Niazi |
| 2015/0095973 A1 | 4/2015 | Neumueller |
| 2016/0134557 A1 | 5/2016 | Steinder |
| 2016/0170791 A1 | 6/2016 | Huh |
| 2017/0046146 A1 | 2/2017 | Jamjoom et al. |
| 2017/0242784 A1 | 8/2017 | Heorhiadi et al. |
| 2017/0359217 A1 | 12/2017 | Ahuja |

(Continued)

OTHER PUBLICATIONS

U.S. Appl. No. 15/677,508, Ahmad Hassan, filed Aug. 15, 2017.

(Continued)

*Primary Examiner* — Brian F Shaw (74) *Attorney, Agent, or Firm* — Fish & Richardson P.C.

(57) ABSTRACT

Methods, systems, and computer-readable storage media for inhibiting security threats in microservice architectures hosted on cloud infrastructures, implementations including receiving, by a microservice used in one or more microservice-based applications, a network packet including a set of features, determining, by the microservice, a probability for the set of features with respect to a set of categories, and identifying, by the microservice, that the network packet corresponds to a first category based on probabilities of the set of features, and, in response, executing an action.

20 Claims, 8 Drawing Sheets

(56) References Cited

U.S. PATENT DOCUMENTS

| | | |
|---|---|---|
| 2018/0032399 A1 | 2/2018 | Johnson et al. |
| 2018/0089011 A1 | 3/2018 | Basin et al. |
| 2018/0248771 A1 | 8/2018 | Côté et al. |
| 2019/0057015 A1 | 2/2019 | Hassan |
| 2019/0058761 A1 | 2/2019 | Hassan |

OTHER PUBLICATIONS

U.S. Appl. No. 15/677,626, Ahmad Hassan, filed Aug. 15, 2017.
NSS [online], "Bayesian Statistics Explained to Beginners in Simple English," Analytics Vidhya: Business Analytics, Jun. 20, 2016, [retrieved Apr. 30, 2019], retrieved from: URL <https://www.analyticsvidhya.com/blog/2016/06/bayesian-statistics-beginners-simple-english/>, 14 pages.
U.S. Appl. No. 14/704,461, Ahmad Hassan, filed May 5, 2015.
U.S. Appl. No. 14/831,567, Ahmad Hassan, filed Aug. 20, 2015.
U.S. Appl. No. 14/831,624, Ahmad Hassan, filed Aug. 20, 2015.
U.S. Appl. No. 15/213,621, Ahmad Hassan, filed Jul. 19, 2016.
U.S. Appl. No. 15/213,626, Ahmad Hassan, filed Jul. 19, 2016.
U.S. Appl. No. 15/213,654, Ahmad Hassan, filed Jul. 19, 2016.
U.S. Appl. No. 15/213,674, Ahmad Hassan, filed Jul. 19, 2016.
U.S. Appl. No. 15/213,754, Ahmad Hassan, filed Jul. 19, 2016.
U.S. Appl. No. 15/213,816, Ahmad Hassan, filed Jul. 19, 2016.
U.S. Appl. No. 15/213,861, Ahmad Hassan, filed Jul. 19, 2016.
U.S. Appl. No. 15/213,930, Ahmad Hassan, filed Jul. 19, 2016.
U.S. Appl. No. 15/213,960, Ahmad Hassan, filed Jul. 19, 2016.
U.S. Appl. No. 15/214,019, Ahmad Hassan, filed Jul. 19, 2016.
U.S. Appl. No. 15/214,082, Ahmad Hassan, filed Jul. 19, 2016.
U.S. Appl. No. 15/214,102, Ahmad Hassan, filed Jul. 19, 2016.
Final Office Action issued in U.S. Appl. No. 15/677,508 dated May 23, 2019, 20 pages.
Non-Final Office Action issued in U.S. Appl. No. 15/677,508 dated Feb. 5, 2019, 17 pages.
Non-Final Office Action issued in U.S. Appl. No. 15/677,626 dated Apr. 30, 2019, 18 pages.

SECURITY IN MICROSERVICE ARCHITECTURES

BACKGROUND

Cloud computing can be described as Internet-based computing that provides shared computer processing resources, and data to computers and other devices on demand. Users can establish respective sessions, during which processing resources, and bandwidth are consumed. During a session, for example, a user is provided on-demand access to a shared pool of configurable computing resources (e.g., computer networks, servers, storage, applications, and services). The computing resources can be provisioned and released (e.g., scaled) to meet user demand.

In some instances, network traffic is modelled in an effort to predict demand to enable efficient provisioning of computing resources. Modelling of a session can be based on states of the respective sessions (e.g., whether a session is in an active state). A traditional architecture includes monolithic applications hosted on one or more servers, which can be accessed by respective users. Modelling user sessions in such traditional architectures is relatively straight-forward to perform, as user interactions are with a single application. Further, applications are modelled to predict software defects, in an effort to understand which component of the application is the source of the defect, and the type of defect that resulted in the failure.

A non-traditional architecture includes microservices, which have gained popularity in service oriented architectures (SOAs). In the microservice architecture, applications are composed of multiple, independent services, and are deployed in standalone containers with a well defined interfaces. The services are deployed and managed by a cloud platform, and run on top of a cloud infrastructure. However, the microservices are deployed and used by many different users (e.g., customers). Consequently, the microservices represent a security risk for the cloud provider. For example, a malicious user of the microservices can initiate an attack on the other microservices. Example attacks can include sending an unlimited request to cause denial of service (DoS) attacks, and targeting the underlying operating system, on which the cloud platform has been deployed. Further, modelling user sessions and predicting defects in non-traditional architectures, such as microservice architectures, are problematic.

SUMMARY

Implementations of the present disclosure are generally directed to inhibiting attacks in a cloud infrastructure. More particularly, implementations of the present disclosure are directed to monitoring network packets to a microservice-based application hosted in a cloud infrastructure. In some implementations, actions include receiving, by a first microservice used in one or more microservice-based applications, a network packet including a set of features, determining, by the first microservice, a probability for the set of features with respect to a set of categories, and identifying, by the first microservice, that the network packet corresponds to a first category based on probabilities of the set of features, and, in response, executing an action. Other implementations of this aspect include corresponding systems, apparatus, and computer programs, configured to perform the actions of the methods, encoded on computer storage devices.

These and other implementations can each optionally include one or more of the following features: the first category includes an attack category, and the action includes inhibiting execution of one or more functions of the microservice; the first category includes a normal category, and the action includes allowing execution of one or more functions of the microservice; the one or more functions include transmitting data to a second microservice; the one or more functions include transmitting data to an operating system of the cloud infrastructure; the network packet is received from a client-side computing device; and the network packet is received from a second microservice on the cloud infrastructure.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to modelling session states of users in microservice architectures. More particularly, implementations of the present disclosure are directed to modelling session states of users in microservice-based applications based on an additive Weibull distribution to provision resources in a cloud infrastructure. Implementations of the present disclosure are also directed to modelling and predicting defects in microservice-based applications. More particularly, implementations of the present disclosure are directed to identifying a microservice as defective, as well as a type of defect for a microservice-based application hosted in a cloud infrastructure. Implementations of the present disclosure are further directed to inhibiting attacks in a cloud infrastructure. More particularly, implementations of the present disclosure are directed to monitoring network packets to a microservice-based application hosted in a cloud infrastructure.

Figure 1:
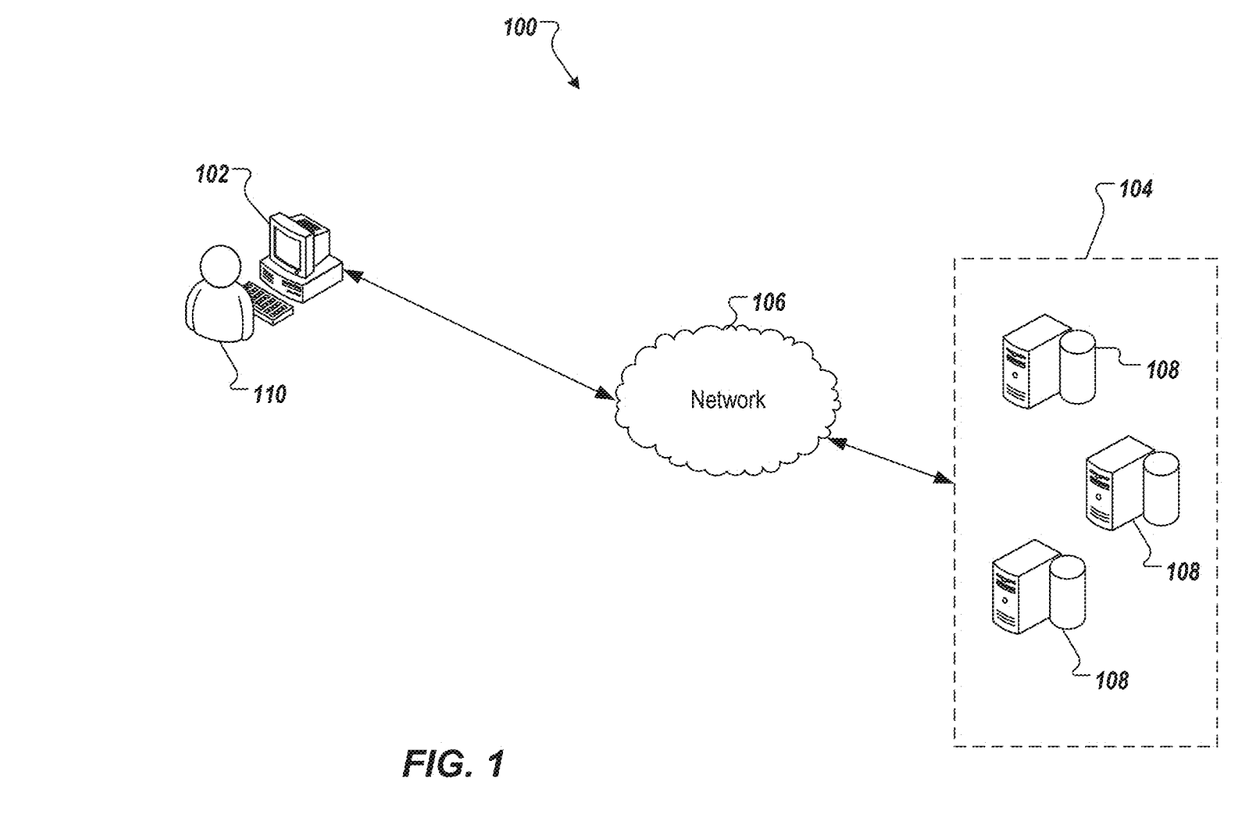
FIG. 1 depicts an example architecture that can be used to execute implementations of the present disclosure.

FIG. 1 depicts an example architecture 100 that can be used to execute implementations of the present disclosure. In the depicted example, the example architecture 100 includes one or more client devices 102, a server system 104 and a network 106. The server system 104 includes one or more server devices 108. In the depicted example, a user 110 interacts with the client device 102. In an example context, the user 110 can include a user, who interacts with an application that is hosted by the server system 104.

In some examples, the client device 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices (e.g., the client device 102) over the network 106.

In accordance with implementations of the present disclosure, the server system 104 can provide a cloud infrastructure to host one more microservice-based applications (e.g., provided as one or more computer-executable programs executed by one or more computing devices). In some examples, computing resources of the server system 104 can be provisioned based on modelling of network traffic associated with use of the one or more microservice-based applications, as described in further detail herein. Also in accordance with implementations of the present disclosure, the server system 104 can host one more microservice-based applications. In some examples, defects in cloud-based, microservice based applications are modelled and predicted, as described in further detail herein. Further in accordance with implementations of the present disclosure, the server system 104 can provide a cloud infrastructure to host one more microservice-based applications.

As introduced above, implementations of the present disclosure are directed to modelling session states of users in microservice architectures based on an additive Weibull distribution to provision resources in a cloud infrastructure. In some examples, a microservices architecture can be described as a type of service-oriented architecture (SOA). In some examples, an application based on microservices can be described as a collection of independent, but loosely coupled services providing modularity, and easing understanding, development, and testing of the application. Each service can be provided as one or more computer-executable programs. A microservices-based application parallelizes development by enabling service-specific teams to independently develop, deploy, and scale their respective services.

Microservice-based applications can be hosted in cloud environments, such that multiple users can concurrently interact with the application, and multiple applications can leverage the same microservice. For example, each user establishes a session with the application, during which the user interacts with the application (e.g., transmits data to, receives data from the application). As the number of users, and/or the activity of users scales up/down, computing resources can be provisioned to support the sessions. For example, computing resources, such as processors, and/or memory can be provisioned. As another example, instances of the application, and/or the microservices underlying the application can be provisioned.

To enable efficient, accurate provisioning of services, network traffic can be predicted (e.g., using a predictive model) based on the number of active user sessions. In some examples, an active user session is a session, during which a user is actively interacting with the cloud-based, microservices-based application (e.g., the user has transmitted data to the application within a threshold period of time). As a metric, session state can be determined based on when a user starts an activity, and when the activity ends. Microservice-based applications pose a particularly difficult modelling problem, as users interact with multiple, different services (e.g., microservices that the application leverages) at the same time.

In view of the above context, implementations of the present disclosure provide for network traffic modelling in cloud-based, microservice-based applications based on an additive Weibull distribution. In accordance with implementations of the present disclosure, the additive Weibull distribution is used to predict network load due to user session activity, when the user is accessing k different services. A cumulative distribution function (CDF) is provided as:

$$f(x) = 1 - e^{-\sum_{i=1}^{k}\left(\frac{x}{\beta_i}\right)^{\alpha_i}} \quad (1)$$

where $\alpha_i$ is a shape parameter ($\alpha_i > 0$), $\beta_i$ is a scale parameter ($\beta_i > 0$), and x is the session time ($x \geq 0$). Following, a probability distribution function (PDF) of the load on the servers is provided as:

$$g(x) = \sum_{i=1}^{k} \frac{a_i}{(\beta_i)^{\alpha_i}} (x)^{\alpha_i + 1} e^{-\sum_{i=1}^{k}\left(\frac{x}{\beta_i}\right)^{\alpha_i}} \quad (2)$$

again, where $\alpha_i$ is a shape parameter ($\alpha_i>0$), $\beta_i$ is a scale parameter ($\beta_i>0$), and x is the session time (x≥0).

In the above models (the CDF of Equation 1, and the PDF of Equation 2), values of $\alpha_i$ and $\beta_i$ are determined using a maximum likelihood estimation (MLE). MLE is a known parameter estimation approach, and can be described as estimating the parameters of a statistical model given observations by finding the parameter values that maximize the likelihood of making the observations given the parameters.

In accordance with implementations of the present disclosure, the following example analyses can be performed using the CDF and PDF of Equations 1 and 2, respectively. A first example analysis includes user session failure rate, or session dropout rate for individual session activity on different microservices. In some examples, a user session failure rate includes a rate, at which sessions were attempted, but failed to be established. In some examples, a session dropout rate includes a rate, at which sessions are established, but are dropped. A second example analysis includes load prediction of cloud servers, on which microservices are deployed.

Figure 2:
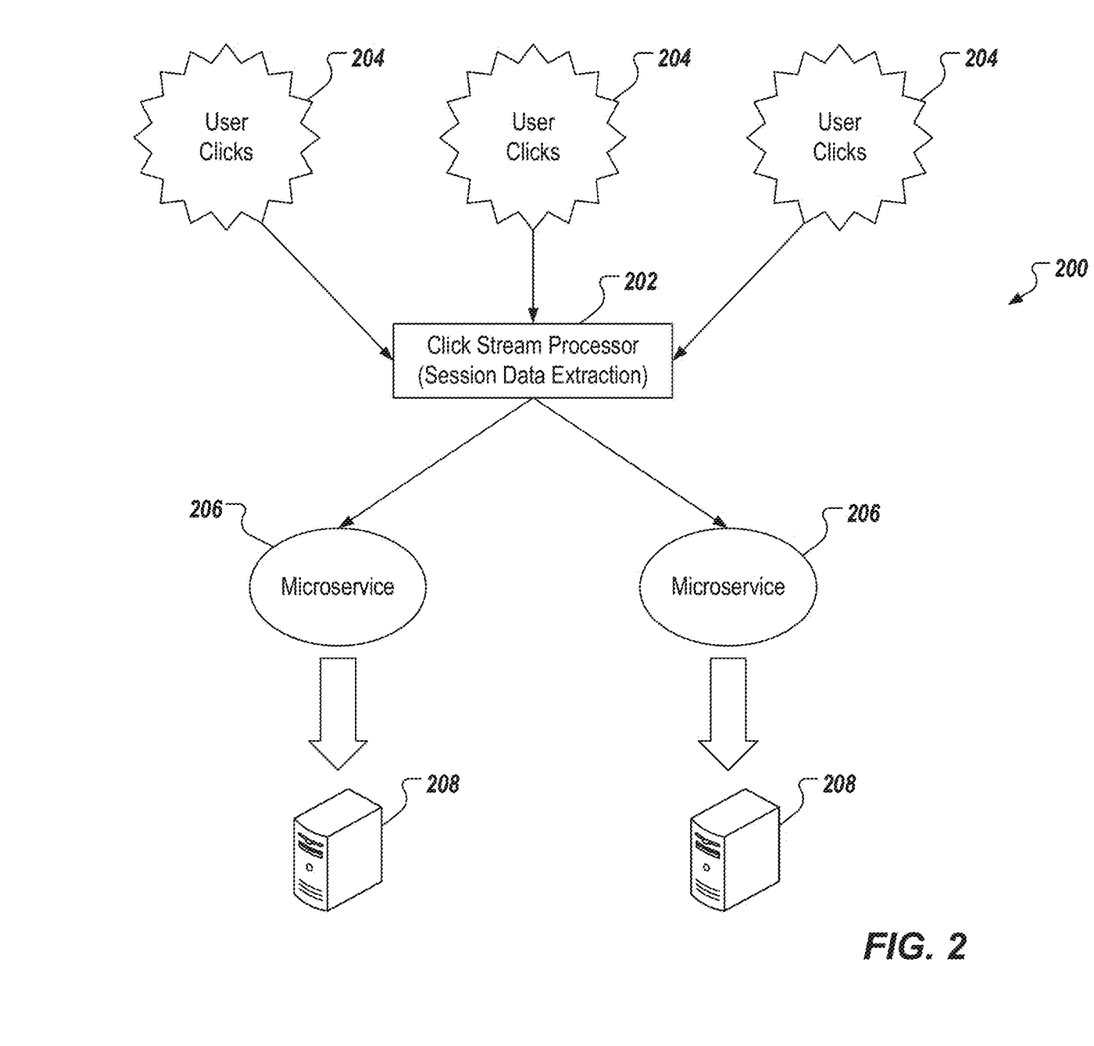
FIG. 2 depicts an example conceptual diagram in accordance with implementations of the present disclosure.

The example analyses will be described with reference to FIG. 2, which depicts an example conceptual diagram 200 in accordance with implementations of the present disclosure. In the example of FIG. 2, a click stream processor (CSP) 202 is provided, which intercepts user activity. In the depicted example, the user activity is represented as user clicks 204 as interactions to microservice-based applications (e.g., user clicking on user interface elements displayed by the application). The user clicks 204 are processed by respective microservices 206, which are hosted on respective servers 208 of the cloud infrastructure. In the depicted example, the number of microservices k is equal to two (k=2).

In some implementations, the CSP 202 processes the events using the additive Weibull distribution of the present disclosure. In some implementations a metric 'BackLoad' is determined, and is representative of a load on a respective microservice in view of the user session activity. In some examples, the load can be categorized (e.g., LOW, HIGH, OK). In some examples, if the load is determined to be HIGH for a microservice, a message can be transmitted to an auto-scaling framework (service) requesting one or more additional instances of the microservice. In some examples, if the load is determined to be LOW for a microservice, a message can be transmitted to the auto-scaling framework (service) indicating that one or more instances of the microservice can be halted.

Figure 3:
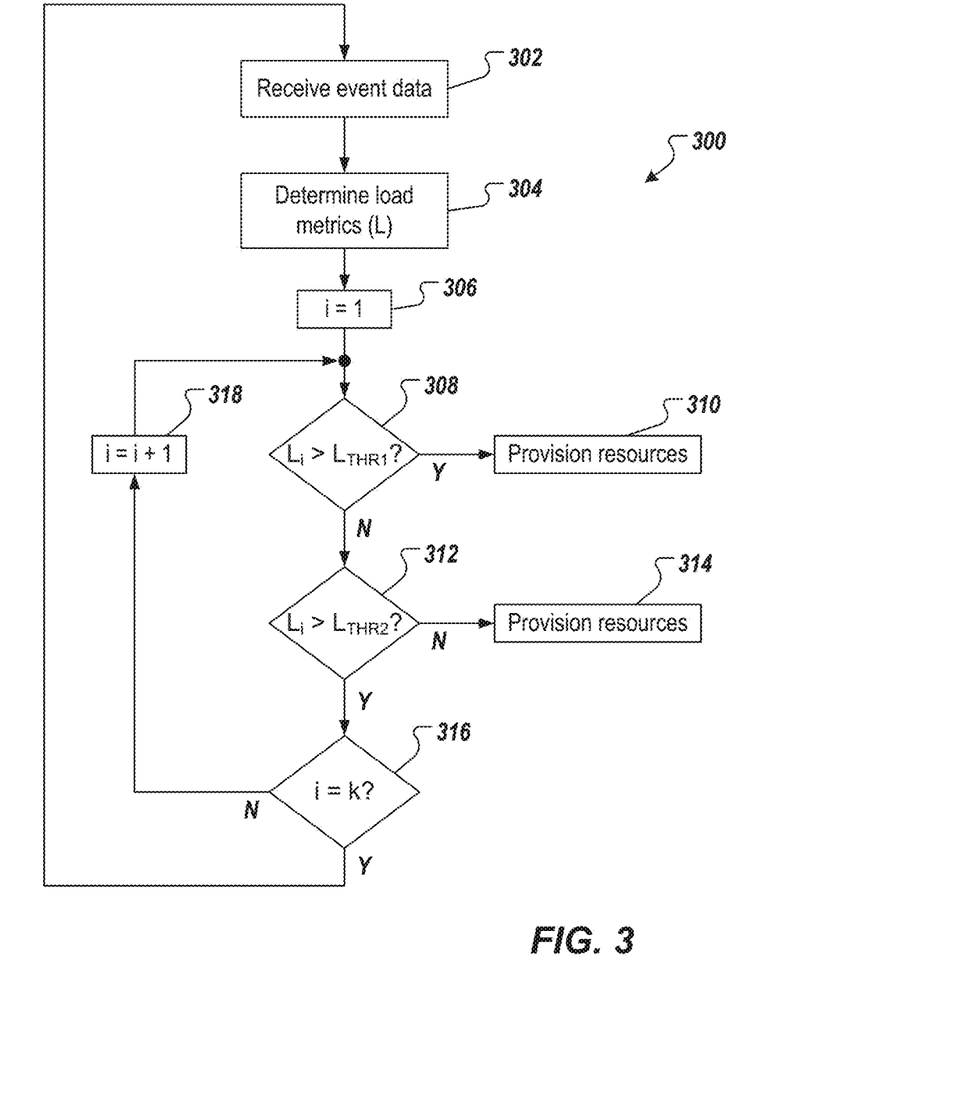
FIG. 3 depicts an example process that can be executed to provision resources in accordance with implementations of the present disclosure.

FIG. 3 depicts an example process 300 that can be executed in accordance with implementations of the present disclosure. In some examples, the example process 300 can be provided by one or more computer-executable programs executed using one or more computing devices. The example process 300 can be performed to selectively provision resources in a cloud infrastructure for a microservices-based application.

Event data is received (302). In some examples, the event data is representative of user sessions with a plurality of microservices, and is received by a CSP. Load metrics (L) are determined (304). In some examples, a load metric is determined for each microservice in the plurality of microservices based on a probability distribution provided in Equation 2, above. A counter i is set equal to 1 (306).

It is determined whether the load metric of the $i^{th}$ microservice ($L_i$) exceeds a first threshold load ($L_{THR1}$) (308). If $L_i$ exceeds $L_{THR1}$, the load is determined to be HIGH for the currently provisioned resources, and resources are provisioned (310). In some examples, in the case of a HIGH load, provisioning of resources includes instantiating one or more instances of the $i^{th}$ microservice. If $L_i$ does not exceed $L_{THR1}$, is determined whether $L_i$ exceeds a second threshold load ($L_{THR2}$) (312). In some examples, $L_{THR1}$ is greater than $L_{THR2}$. If $L_i$ exceeds $L_{THR2}$, the load is determined to be LOW for the currently provisioned resources, and resources are provisioned (314). In some examples, in the case of a LOW load, provisioning of resources includes halting one or more instances of the $i^{th}$ microservice.

If $L_i$ does exceed $L_{THR2}$, the load is determined to be OK for the currently provisioned resources, and it is determined whether i is equal to k (the number of microservices being considered) (316). If i is not equal to k, i is incremented (318), and the example process 300 loops back to consider the load metric of the next microservice. If i is equal to k, all of the microservices have been considered, and the example process 300 loops back.

Implementations of the present disclosure provide one or more of the following example advantages. In some implementations, the additive Weibull distribution of the present disclosure enables the impact of user interaction with multiple microservices interference to be modeled. Traditional techniques have not considered the use case where a user is interacting with multiple different microservices at the same time. In cloud-based microservice architectures, multiple services act together to complete the user requests. Implementations of the present disclosure model that behavior, and enable intelligent, efficient scaling of individual microservices to be performed.

As introduced above, implementations of the present disclosure are also directed to identifying a microservice within a plurality of microservices as defective, as well as a type of defect for a microservice-based application hosted in a cloud infrastructure. As discussed herein, microservice-based applications can be hosted in cloud environments, in which the multiple services are independently executed. As previously noted, cloud computing has enabled a wide range of opportunities to deploy services on demand. One example benefit is that the user does not need to administer and maintain the infrastructure where the service is deployed. However, cloud environments also bring the inherent risk of failing components in a distributed deployment paradigm. In terms of cloud-hosted, microservice-based applications, if one cloud microservice fails then applications leveraging the microservice break down until the failed microservice backs up to a running state.

Figure 4:
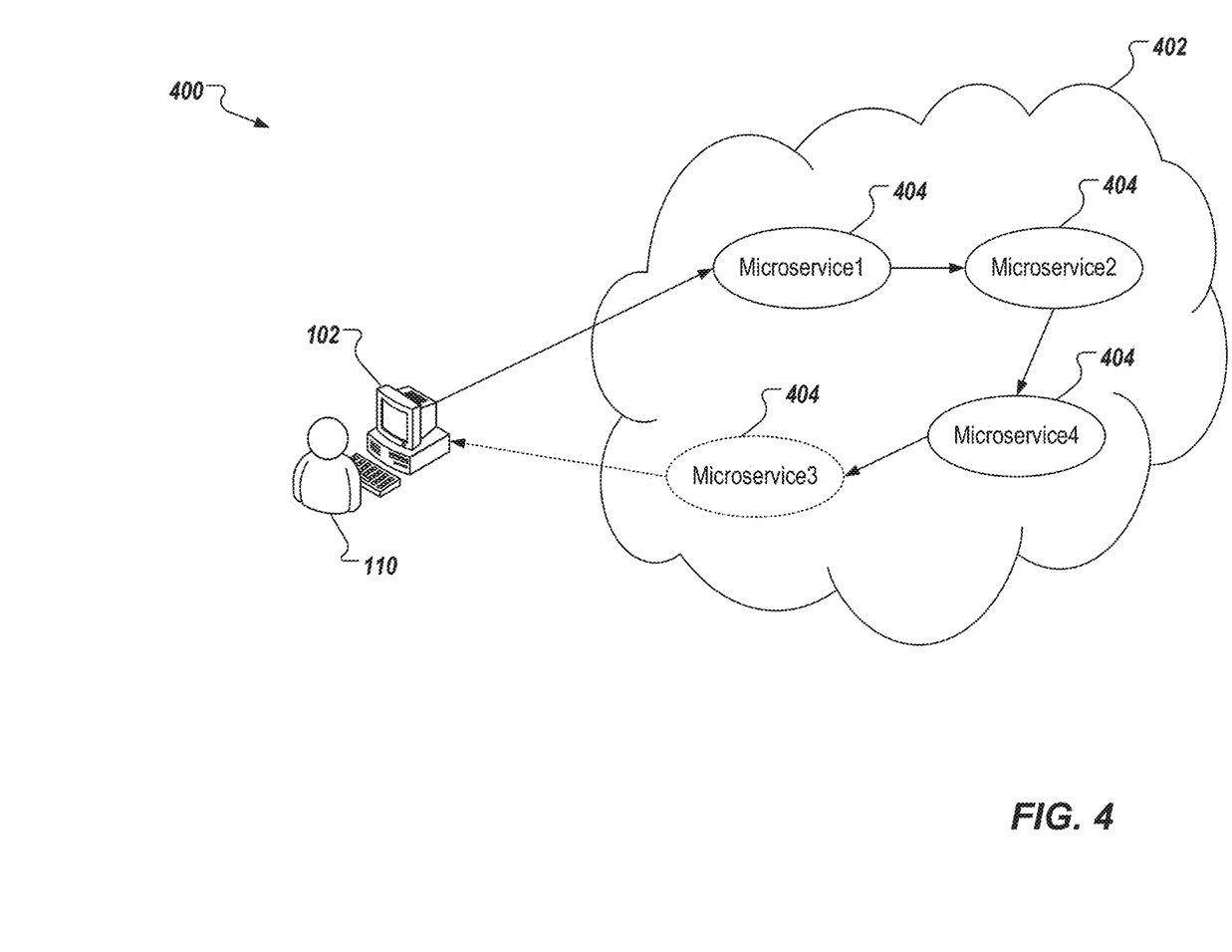
FIG. 4 depicts an example conceptual diagram of a microservice-based application in accordance with implementations of the present disclosure.

FIG. 4 depicts an example conceptual diagram 400 of a microservice-based application in accordance with implementations of the present disclosure. In the depicted example, a cloud environment 402 hosts an application that is composed of a plurality of microservices 404. In some examples, multiple applications can leverage a microservice. With reference to FIG. 1, the user 110 can interact with the application using the computing device 102. For example, the computing device 102 provides input to the application, and receives output from the application. In the depicted example, the application includes four microservices 404, labelled as Microservice1, Microservice2, Microservice3, and Microservice4. In the example of FIG. 4, Microservice1 receives input from the computing device 102, provides output to Microservice2, which provides output to Microservice4, which provides output to Microservice3, which provides output to the computing device 102. In the depicted example, Microservice3 has failed, as graphically represented by the dashed lines.

As introduced above, modelling, and predicting software defects in microservice-based applications is particularly problematic. In this vein, key questions include how to model an unlimited number of defects types within the software components deployed as microservices on top of a cloud infrastructure, and how to distinguish and model multiple defect types within set of microservices.

In view of the foregoing, implementations of the present disclosure provide a statistical technique to model software defect types in microservices running on top of a cloud infrastructure. Implementations of the present disclosure provide a generalized extension to the Bayesian statistical framework. In some examples, the Bayesian statistical framework is based on the Bayes Theorem, which models the conditional probability between random variables. A Bayesian statistical framework uses the Bayes Theorem to model conditional probabilities between random events A and B to derive more precise results based on gathered evidence. Bayesian statistical framework models cause-effect relationships as a directed acyclic graph, where the effect of a parent node is shown as a child node, and edges represent the conditional probability of a child node due to the parent node. The Bayesian statistical framework represents the inter-relationships between events, and facilitate predictive modelling based on past events using posterior probability distribution.

In accordance with implementations of the present disclosure, A can be the set of i microservices in a software system (an application) hosted in a cloud infrastructure, and j represents types of different defects that can occur to the microservices in A. A prior distribution of microservices failure can be represented as:

$$A_{i,j} = P(A_{i,j}) \quad (3)$$

where i=1, 2, ..., n, and j=1, 2, ..., m. In some examples, i is a counter to indicate a respective microservice in the set of microservices A, and j is a counter to indicate a particular defect in a set of defects. Accordingly, Equation 3 represents a probability that a microservice $A_i$ has a defect of type j.

S can be defined as a sample space of software defects, which covers all possible defects (e.g., router failure, exception in thread execution, microservice stalls). B can be provided as a discrete random variable showing the defects in various components. In some examples, B can be expressed as:

$$B = \begin{cases} yes_1 = \text{defect in component } 1 \\ yes_2 = \text{defect in component } 2 \\ \quad \ldots \\ yes_n = \text{defect in component } n \end{cases}$$

In accordance with implementations of the present disclosure, the posterior probability distribution of failure model under the condition that there is a defect in n components is provided as:

$$P(A_{i,j} \mid B = yes_{i,j}) = \frac{P(B = yes_{i,j} \mid A_{i,j}) * P(A_{i,j})}{\sum_{i=1}^{n} P(A_{i,j} \mid B = yes_{i,j}) * P(A_{i,j})} \quad (4)$$

Accordingly, the posterior probability distribution of the present disclosure learns from the prior distribution, and gives the whole flow of the actual cause of failure in a distributed system. The posterior model of Equation 4 models the particular microservice and the particular failure, in the event of an entire microservice-based application failure.

In accordance with implementations of the present disclosure, a service process (e.g., executed on the cloud infrastructure) implements the posterior probability distribution of failure model to identify a particular microservice having a defect, as well as the type of defect. In some examples, the service process receives error logs from each microservice. For example, an error log for a microservice can be provided at regular intervals (e.g., secondly, minutely, hourly, daily, weekly). As another example, an error log can be provided in response to an entry being added to the error log. In some examples, the service process processes data in the error log using the posterior probability distribution of the present disclosure to detect which particular defect in a particular microservice has caused a system breakdown.

Figure 5:
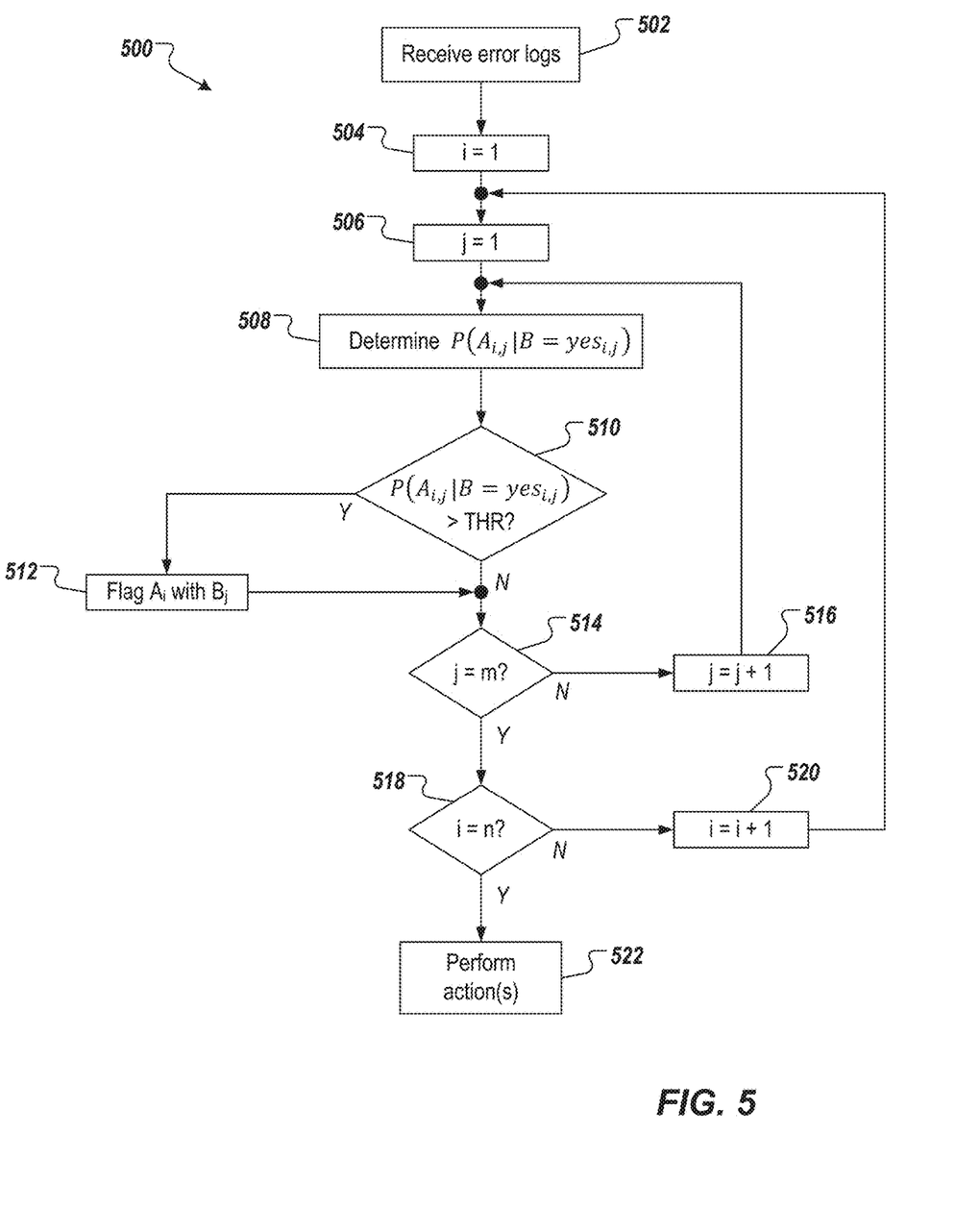
FIG. 5 an example process that can be executed to predict defects in accordance with implementations of the present disclosure.

FIG. 5 depicts an example process 500 that can be executed in accordance with implementations of the present disclosure. In some examples, the example process 500 can be provided by one or more computer-executable programs executed using one or more computing devices.

One or more error logs are received (502). For example, a service process executing on a cloud infrastructure can receive the one or more error logs. In some examples, each error log includes event data associated with one or more events impacting a set of microservices executing on the cloud infrastructure. A counter i is set equal to 1 (504). A counter j is set equal to 1 (506).

A probability that a microservice $A_i$ in the set of microservices experienced a particular type of defect determined by a discrete random variable B is determined (508). For example, the service process determine the probability based on event data in the one or more error logs using Equation 2, as described herein. It is determined whether the probability exceeds a threshold (510). If the probability exceeds the threshold, the microservice $A_i$ is recorded to have the defect j (512). For example, a defect log is provided, and the microservice $A_i$ is recorded as having the defect j in the defect log.

It is determined whether the counter j is equal to m (514). If the counter j is not equal to m, not all defects have been considered for the microservice $A_i$. Consequently, the counter j is incremented (516), and the example process 500 loops back. It is determined whether the counter i is equal to n (518). If the counter i is not equal to n, not all microservices have been considered. Consequently, the counter i is incremented (520), and the example process 500 loops back. If the counter i is equal to n, all microservices have been considered, and one or more actions are performed (522). In some examples, for each microservice A recorded in a defect log, one or more actions can be performed, at least one action depending on the type of defect recorded. Example actions can include, without limitation, shutting down a defective microservice on the cloud platform, and instantiating another instance of a defective microservice on the cloud platform.

Implementations of the present disclosure provide one or more of the following example advantages. The present disclosure addresses issues unique to cloud infrastructures, and particularly unique to microservice-based applications hosted in cloud infrastructures. As described herein, implementations of the present disclosure enables a particular microservice to be identified as the source of a system failure, as well as the particular type of defect. This is important in cloud-based microservice systems, in which multiple microservices are running and working together to make a complete application. If any single microservice breaks down the whole system, implementations of the present disclosure provide a resource-efficient model to detect, and identify such instances, which otherwise could not be possible before.

As introduced above, implementations of the present disclosure are also directed to monitoring network packets to a microservice-based application hosted in a cloud infrastructure. To provide further context for implementations of the present disclosure, and in some examples, the same microservice is used in multiple applications. For example, a microservice can be used in a first application, and a separate and distinct second application. Accordingly, microservices are deployed and used by many different users (e.g., customers). Consequently, microservices represent a security risk for the cloud infrastructure providers, on which the microservices are executed. For example, a malicious user can use a microservice to initiate an attack on other microservices. Example attacks can include sending an unlimited request to cause denial of service (DoS) attacks, and targeting the underlying operating system, on which the cloud platform has been deployed.

Figure 6:
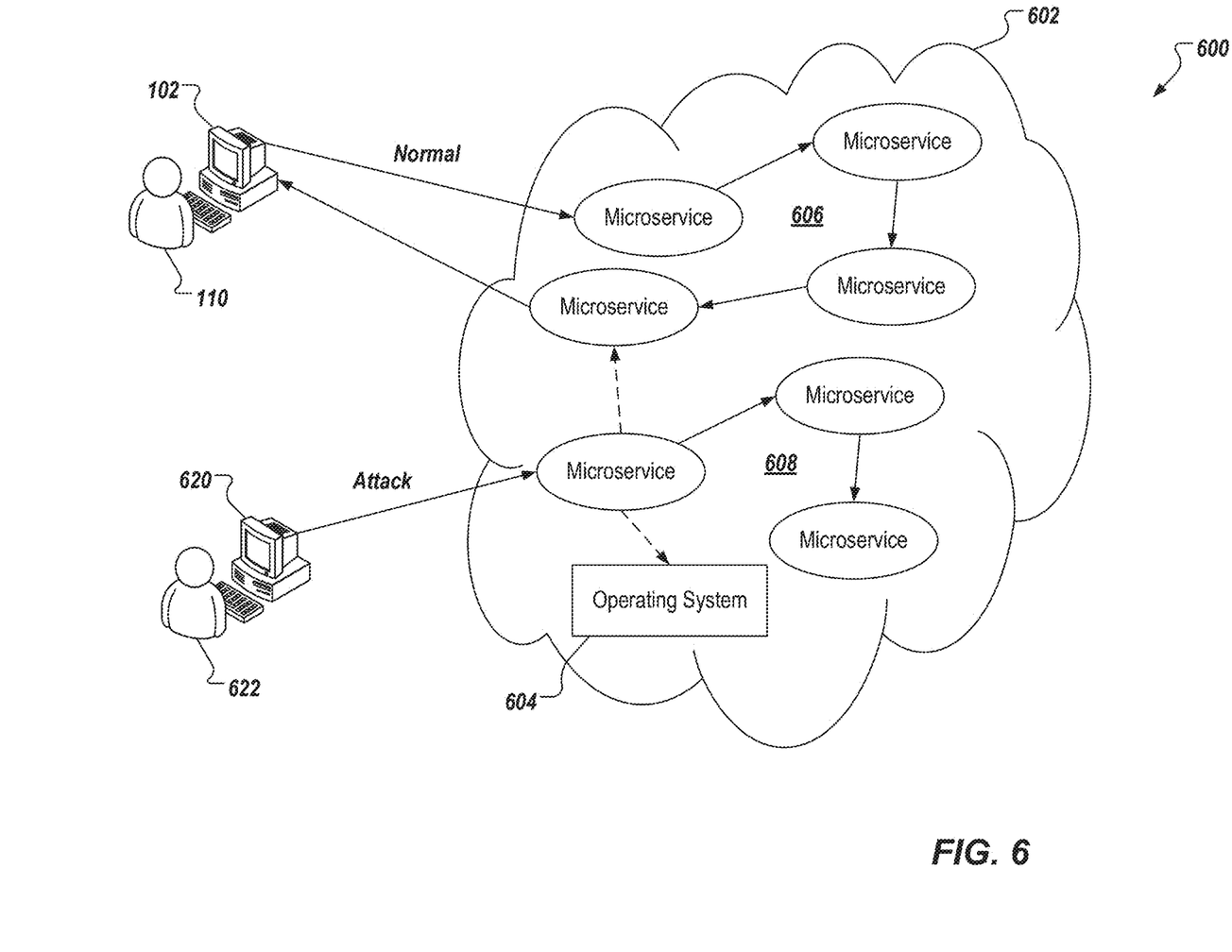
FIG. 6 depicts an example conceptual diagram of security risks in cloud-hosted, microservice architectures.

FIG. 6 depicts an example conceptual diagram 600 of security risks in cloud-hosted, microservice architectures. In the depicted example, a cloud environment 602 includes a cloud platform 604. Example cloud environments include OpenStack provided by Openstack.org, Amazon Elastic Compute Cloud provided by Amazon Web Services, Inc. of Seattle, Wash., US, and SAP Monsoon provided by SAP SE of Walldorf, Germany. An example cloud platform includes Cloud Foundry provided by Cloud Foundry, Inc.

The cloud environment 602 hosts applications that are composed of a plurality of microservices. In the depicted example, a first application is provided using a first set of microservices 606, and a second application is provided using a second set of microservices 608. In some examples, multiple applications can use the same microservice(s). With reference to FIG. 1, the user 110 can interact with the first application using the computing device 102. For example, the computing device 102 provides input to the application, and receives output from the application. In the depicted example, the application includes four microservices, which interact to provide output to the computing device 102.

In the depicted example, a malicious user 622 uses a computing device 620 to conduct an attack on the second application, through its respective microservices (e.g., the second set of microservices 608). In the example of FIG. 6, the attack on the second application can progress to the first application, and/or the operating system 604, as graphically represented by the dashed arrows. An example attack can include a denial of service (DOS) attack on the underlying operating system (e.g., the operating system 604), which can be initiated through a microservice, and includes sending constant unnecessary events to the underlying system.

In view of the foregoing, and as introduced above, implementations of the present disclosure provide a statistical approach to detect security threats from each microservice within a cloud deployment. Further, implementations of the present disclosure classify attacks into individual threat type using statistical classification, as described herein. The statistical approach of the present disclosure is based on a probablistic model that classifies network packets (e.g., coming from a microservices network interface) as being NORMAL or ATTACK. Implementations of the present disclosure are considered highly optimized, as a relatively small subset of data is used to train the probabilistic model, which is able to accurately classify the incoming network packets. Further, implementations of the present disclosure are particularly suited and optimized for cloud environments, in which the underlying processing resources are limited to process relatively large amounts of incoming data.

Accordingly, implementations of the present disclosure are able to screen for security threats in real-time, or near real-time. More particularly, traditional approaches would be required to process an event stream having millions of events, and it is impractical to process all of these events in real-time, and draw an accurate conclusion. Implementations of the present disclosure resolve this issue by using the model provided herein, where a relatively small subset of events can be fed into the model for analysis, requiring a significantly reduced amount of processing (CPU) resources as compared to traditional approaches. As a result, implementations of the present disclosure enable a determination to be made about potential attacks in real-time, or near real-time.

In accordance with implementations of the present disclosure, all network traffic for each microservice is monitored, and each network packet is extracted. In some implementations, each network packet can be described by its attributes, or features. In some examples, f represents a single feature of a network packet. Accordingly, a network packet is defined as a collection of all of its features, and can be provided as follows:

$$\text{packet} = (f_1, f_2, f_3, \ldots, f_n) \to \text{packet} = \Sigma_{i=1}^n f_i$$

Example features include protocol type, duration of network connection, number of bytes transferred from source to destination, number of bytes transferred from destination to source, number of network connections to the same destination, network service type (e.g., HTTP, FTP), and destination host connection error rate.

Implementations of the present disclosure solve a classification problem, where a packet from microservice can belong to a particular category of ATTACK, or it is considered as NORMAL. The categories can be defined as a collection, as follows:

$$C = (c_1, c_2, c_3, \ldots, c_m)$$

As introduced above, implementations of the present disclosure provide a statistical technique to predict future attacks using prior knowledge. Accordingly, as subsequent network packets are received, each with a respective combination of features, the probabilistic model assigns each network packet to a category to that particular packet. In this manner, each network packet is classified as ATTACK, or NORMAL. In accordance with implementations of the present disclosure, the posterior probability function to predict feature group F to a category $c_i$, the maximum probability $P(c_i|F)$ is determined for all m categories. The maximum probability is determined by applying Bayes rule, as follows:

$$P(c_i \mid F) = \frac{P_{c_i} \times P(F \mid c_i)}{\sum_{i=1}^{m} P_{c_i} \times P(F \mid c_i)}$$

In some implementations, each microservice includes a component (e.g., computer-executable code) to evaluate incoming network packets, as described herein. For example, a microservice that receives a network packet from a user (e.g., from the computing device 102, 220 of FIG. 2) evaluates the network packet, as described herein, to determine whether the network packet is NORMAL, or ATTACK. As another example, a microservice that receives a network packet from another microservice evaluates the network packet, as described herein, to determine whether the network packet is NORMAL, or ATTACK. In this manner, each network packet from user input through a chain of microservices is evaluated for potential threat.

In some implementations, if a microservice is identified as a threat, one or more actions can be performed to mitigate, or eliminate the threat. In some examples, the microservice can be added to a blacklist to inhibit future communication with the microservice. In some examples, all the external communications to the microservice are blocked. In some examples, the microservice itself is shutdown by the cloud service provider.

Figure 7:
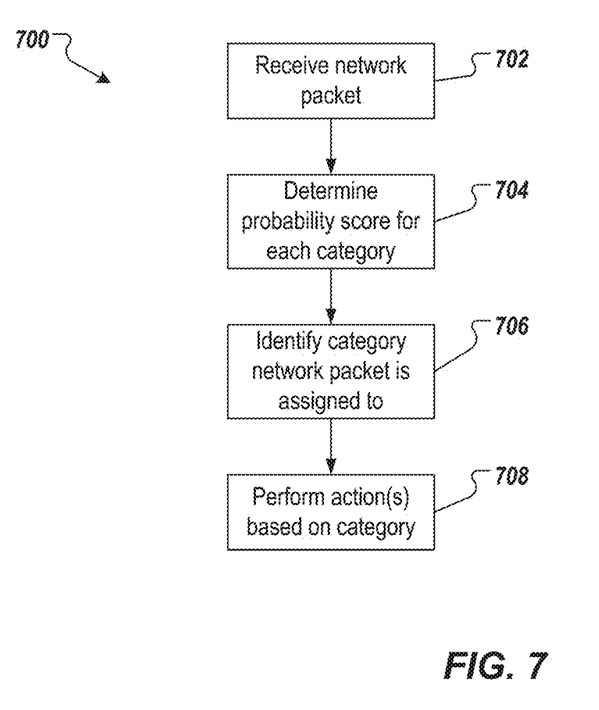
FIG. 7 an example process that can be executed to inhibiting attacks in accordance with implementations of the present disclosure.

FIG. 7 depicts an example process 700 that can be executed in accordance with implementations of the present disclosure. In some examples, the example process 700 can be provided by one or more computer-executable programs executed using one or more computing devices.

A network packet is received (702). For example, a microservice hosted on a cloud platform receives an inbound network packet, the network packet including a set of features. A probability score is determined for each category in a set of categories (704). For example, a probability is determined for each category based on the features in the set of features. In some examples, categories include ATTACK and NORMAL. In some examples, the probability for each category are determined by a component (e.g., computer-executable code) of the microservice.

A category that the network packet is assigned to is identified (706). In some examples, the network packet is assigned to the category having the highest probability. For example, a first probability can be determined for a first category, and a second probability can be determined for a second category. If the second probability is greater than the first probability, the network packet is assigned to the second category. One or more actions are performed based on the category (708). For example, if the microservice is determined to be a threat (e.g., the category of the network packet is identified as ATTACK), example actions include adding to a blacklist to inhibit future communication with the microservice, blocking all the external communications to the microservice, and shutting down the microservice by the cloud service provider. As another example, if the microservice is determined not to be a threat (e.g., the category of the network packet is identified as NORMAL), an example action includes allowing execution of one or more functions of the microservice.

Implementations of the present disclosure provide one or more of the following example advantages. Implementations of the present disclosure are optimized with respect to computing resources required, as implementations process a relatively small subset of data to train the model. The model is used to process packet data in a time- and resource-efficient manner to accurately classify incoming packets in real-time, or near real-time. Implementations of the present disclosure are flexible in that they are not restricted to any particular set of classification features. Instead, implementations of the present disclosure are generic, and can be used with any number of classification features to classify events.

Figure 8:
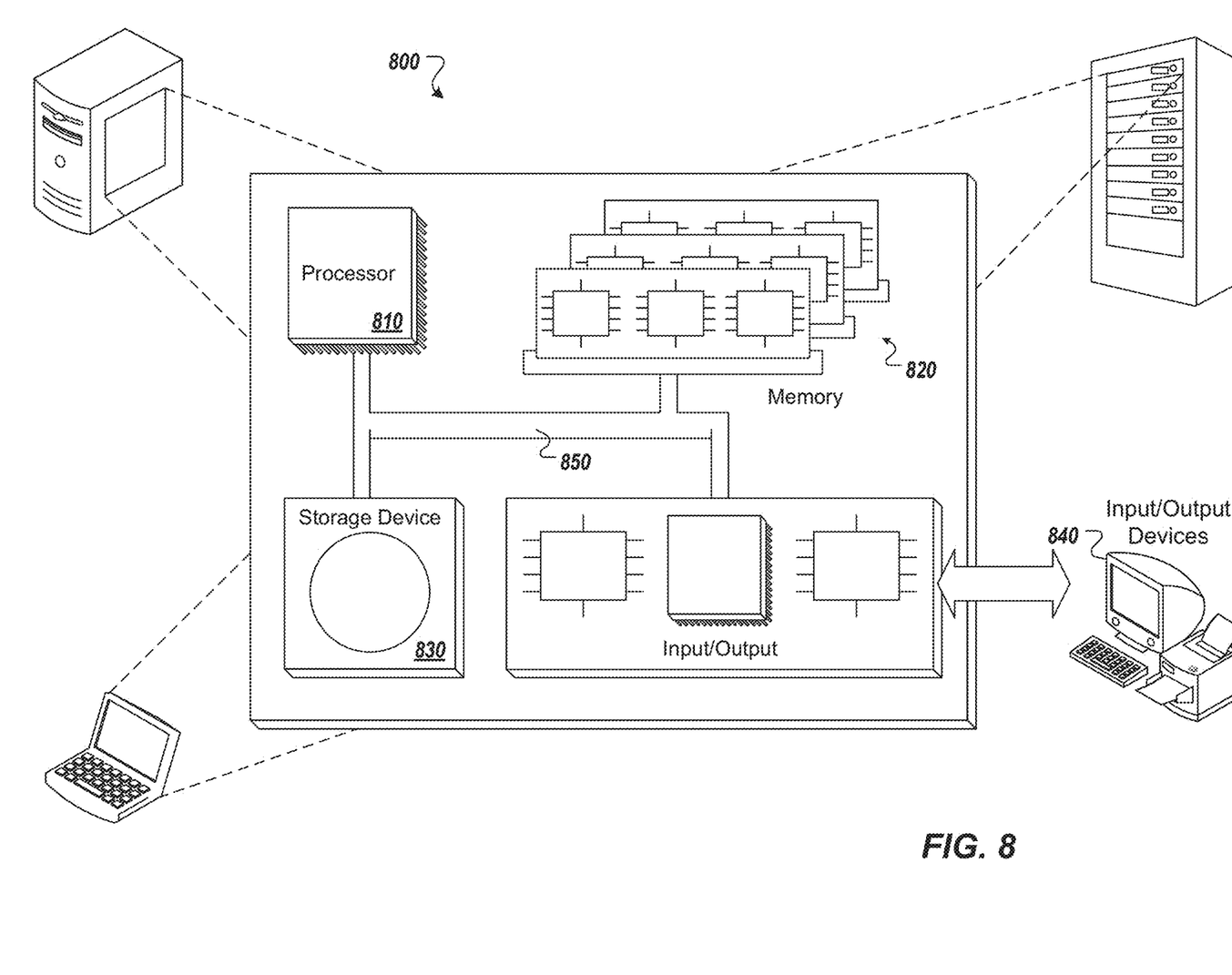
FIG. 8 is a schematic illustration of example computer systems that can be used to execute implementations of the present disclosure.

FIG. 8 depicts a schematic diagram of an example computing system 800. The system 800 may be used to perform the operations described with regard to one or more implementations of the present disclosure. For example, the system 800 may be included in any or all of the server components, or other computing device(s), discussed herein.

The system 800 may include one or more processors 410, one or more memories 820, one or more storage devices 830, and one or more input/output (I/O) devices 840. The components 810, 820, 830, 840 may be interconnected using a system bus 850.

The processor 810 may be configured to execute instructions within the system 800. The processor 810 may include a single-threaded processor or a multi-threaded processor. The processor 810 may be configured to execute or otherwise process instructions stored in one or both of the memory 820 or the storage device 830. Execution of the instruction(s) may cause graphical information to be displayed or otherwise presented via a user interface on the I/O device 840. The memory 820 may store information within the system 800. In some implementations, the memory 820 is a computer-readable medium. In some implementations, the memory 820 may include one or more volatile memory units. In some implementations, the memory 820 may include one or more non-volatile memory units.

The storage device 830 may be configured to provide mass storage for the system 800. In some implementations, the storage device 830 is a computer-readable medium. The storage device 830 may include a floppy disk device, a hard disk device, an optical disk device, a tape device, or other type of storage device. The I/O device 840 may provide I/O operations for the system 800. In some implementations, the I/O device 840 may include a keyboard, a pointing device, or other devices for data input. In some implementations, the I/O device 840 may include output devices such as a display unit for displaying graphical user interfaces or other types of user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for inhibiting security threats in microservice architectures hosted on a cloud infrastructure, the method being executed by one or more processors and comprising:
    receiving, by a first microservice used in one or more microservice-based applications hosted on the cloud infrastructure, a network packet comprising a set of features F;
    determining, by the first microservice, a probability P that the set of features F corresponds to a category $c_i$ in a set of categories C using a probabilistic model, the probabilistic model applying a rule for detecting a maximum probability:

$$P(c_i | F) = \frac{P_{c_i} \times P(F | c_i)}{\sum_{i=1}^{m} P_{c_i} \times P(F | c_i)}$$

where m is a number of categories in the set of categories and i is a counter that increases from 1 to m;
    determining, by the first microservice, substantially in near real time that the network packet corresponds to a first category within the set of categories C based on the probability P; and
    in response to determining that the network packet corresponds to the first category, executing, by the first microservice, an action comprising shutting down a defective microservice on the cloud infrastructure and instantiating another instance of the defective microservice on the cloud infrastructure.

2. The method of claim 1, wherein the first category comprises an attack category, and the action comprises inhibiting execution of one or more functions of the microservice.

3. The method of claim 1, wherein the first category comprises a normal category, and the action comprises allowing execution of one or more functions of the microservice.

4. The method of claim 3, wherein the one or more functions comprise transmitting data to a second microservice.

5. The method of claim 3, wherein the one or more functions comprise transmitting data to an operating system of the cloud infrastructure.

6. The method of claim 1, wherein the network packet is received from a client-side computing device.

7. The method of claim 1, wherein the network packet is received from a second microservice on the cloud infrastructure.

8. A non-transitory computer-readable storage medium coupled to one or more processors and having instructions stored thereon which, when executed by the one or more processors, cause the one or more processors to perform operations for inhibiting security threats in microservice architectures hosted on a cloud infrastructure, the operations comprising:
    receiving, by a first microservice used in one or more microservice-based applications hosted on the cloud infrastructure, a network packet comprising a set of features F;
    determining, by the first microservice, a probability P that the set of features F corresponds to a category $c_i$ in a set of categories C using a probabilistic model, the probabilistic model applying a rule for detecting a maximum probability:

$$P(c_i | F) = \frac{P_{c_i} \times P(F | c_i)}{\sum_{i=1}^{m} P_{c_i} \times P(F | c_i)}$$

where m is a number of categories in the set of categories and i is a counter that increases from 1 to m;
    determining, by the first microservice, substantially in near real time that the network packet corresponds to a first category within the set of categories C based on the probability P; and
    in response to determining that the network packet corresponds to the first category, executing, by the first microservice, an action comprising shutting down a defective microservice on the cloud infrastructure and instantiating another instance of the defective microservice on the cloud infrastructure.

9. The computer-readable storage medium of claim 8, wherein the first category comprises an attack category, and the action comprises inhibiting execution of one or more functions of the microservice.

10. The computer-readable storage medium of claim 8, wherein the first category comprises a normal category, and the action comprises allowing execution of one or more functions of the microservice.

11. The computer-readable storage medium of claim 10, wherein the one or more functions comprise transmitting data to a second microservice.

12. The computer-readable storage medium of claim 10, wherein the one or more functions comprise transmitting data to an operating system of the cloud infrastructure.

13. The computer-readable storage medium of claim 8, wherein the network packet is received from a client-side computing device.

14. The computer-readable storage medium of claim 8, wherein the network packet is received from a second microservice on the cloud infrastructure.

15. A system, comprising:
a computing device; and
a computer-readable storage device coupled to the computing device and having instructions stored thereon which, when executed by the computing device, cause the computing device to perform operations for inhibiting security threats in microservice architectures hosted on a cloud infrastructure, the operations comprising:
receiving, by a first microservice used in one or more microservice-based applications hosted on the cloud infrastructure, a network packet comprising a set of features F;
determining, by the first microservice, a probability P that the set of features F corresponds to a category $c_i$ in a set of categories C using a probabilistic model, the probabilistic model applying a rule for detecting a maximum probability:

$$P(c_i \mid F) = \frac{P_{c_i} \times P(F \mid c_i)}{\sum_{i=1}^{m} P_{c_i} \times P(F \mid c_i)}$$

where m is a number of categories in the set of categories and i is a counter that increases from 1 to m;
determining, by the first microservice, substantially in near real time that the network packet corresponds to a first category within the set of categories C based on the probability P; and
in response to determining that the network packet corresponds to the first category, executing, by the first microservice, an action comprising shutting down a defective microservice on the cloud infrastructure and instantiating another instance of the defective microservice on the cloud infrastructure.

16. The system of claim 15, wherein the first category comprises an attack category, and the action comprises inhibiting execution of one or more functions of the microservice.

17. The system of claim 15, wherein the first category comprises a normal category, and the action comprises allowing execution of one or more functions of the microservice.

18. The system of claim 17, wherein the one or more functions comprise transmitting data to a second microservice.

19. The system of claim 17, wherein the one or more functions comprise transmitting data to an operating system of the cloud infrastructure.

20. The system of claim 17, wherein the network packet is received from a client-side computing device.

* * * * *